Patented June 5, 1928.

1,672,293

UNITED STATES PATENT OFFICE.

RICHARD HOLLIS ALLISON, OF SHREVEPORT, LOUISIANA, ASSIGNOR TO ROYAL MUR-ALITE CORPORATION, INC., A CORPORATION OF LOUISIANA.

MAGNESITIC ARTIFICIAL STONE.

No Drawing. Application filed August 25, 1926. Serial No. 131,540.

My invention relates to the manufacture of artificial stone, and has particular reference to the production of a magnesitic artificial stone which is capable of being made up in a variety of shapes or designs.

In the manufacture of my improved stone the principles of the invention are carried out as follows.—Superfine Portland cement in the quantity desired is mixed with an equal part by volume of calcined American magnesite and to this mixture is added one-fourth by volume of pulverized alum. The amount of alum employed is to be one-fourth as much as the total amount of the cement and magnesite. These ingredients are well mixed in dry form and to the mixture thus produced is added from one and one-half to two times as much silica, by volume.

As another step in producing the stone, equal parts by volume of water and flake magnesium chloride are mixed and to each five gallons of liquid there is added one ounce of chemically pure sulphuric acid. After foaming has ceased, the foam may be skimmed off or otherwise removed from the liquid.

The liquid is then added to the dry cement and the mixture stirred until it reaches the approximate consistency of molasses, that is until it becomes thin enough to pour.

A coloring material is made up of four parts by volume, of calcined magnesite to one part of dry mineral paint mixed with a sufficient quantity of the liquid produced as above described, to render the pigment material thin enough to pour.

The pigment is then added to the cement mixture and the entire mass is agitated slightly to distribute the pigment entirely throughout the mass after which it is poured into nickel plated or polished steel molds of any desired design or shape. It should be left in the molds over a period of approximately twelve hours after which the stone will have become firmly set and ready for use.

The stone thus produced is hard and non-porous. It has a natural glaze or polish on its surface, which with the coloring matter, makes it highly desirable as an ornamental element.

The cement is used because of its hardness and it is mixed with magnesite to procure a quick set. The surface polish is caused by the alum in the composition. Sulphuric acid is used in the magnesium chloride for cleaning and bleaching, and to prevent discolorization in the finished product. The sand or silica is of course the base.

I claim:—

1. A magnesitic artificial stone formed of Portland cement, calcined American magnesite, pulverized alum, and silica mixed in dry form and having added thereto a liquid containing water, magnesium chloride and sulphuric acid, and a pigment carrying material mixed therewith.

2. A magnesitic artificial stone comprising equal parts by volume of superfine Portland cement and calcined American magnesite, pulverized alum in an amount equal by volume to one-fourth the amount of said cement and magnesite, silica in an amount substantially twice by volume that of the combined cement, magnesite and alum, a liquid containing sulphuric acid added thereto and a pigment material containing magnesite added to the mixture.

In testimony whereof I have affixed my signature.

RICHARD HOLLIS ALLISON.